(12) United States Patent
Takaki

(10) Patent No.: US 9,697,445 B2
(45) Date of Patent: Jul. 4, 2017

(54) IMAGE FORMING APPARATUS, IMAGE FORMATION CONTROL PROGRAM, AND IMAGE FORMATION CONTROL METHOD

(71) Applicant: KONICA MINOLTA INC., Chiyoda-ku, Tokyo (JP)

(72) Inventor: Kouichi Takaki, Hachioji (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 14/743,546

(22) Filed: Jun. 18, 2015

(65) Prior Publication Data

US 2015/0370511 A1 Dec. 24, 2015

(30) Foreign Application Priority Data

Jun. 23, 2014 (JP) ................. 2014-128008

(51) Int. Cl.
| | |
|---|---|
| *G06F 15/00* | (2006.01) |
| *G06K 15/02* | (2006.01) |
| *B41J 13/00* | (2006.01) |

(52) U.S. Cl.
CPC ...... *G06K 15/1809* (2013.01); *B41J 13/0054* (2013.01); *G06K 15/024* (2013.01); *G06K 15/1894* (2013.01)

(58) Field of Classification Search
CPC ................................. G06K 15/1809
USPC ............................................ 358/1.6
See application file for complete search history.

(56) References Cited

U.S. PATENT DOCUMENTS

| | | | | |
|---|---|---|---|---|
| 2003/0048324 A1* | 3/2003 | Fujimoto | ............... | B41J 29/393 347/19 |
| 2014/0055547 A1* | 2/2014 | Mori | ........................ | B41J 2/325 347/217 |

FOREIGN PATENT DOCUMENTS

JP 06278938 A 10/1994

\* cited by examiner

*Primary Examiner* — Mark Milia
(74) *Attorney, Agent, or Firm* — Holtz, Holtz & Volek PC

(57) ABSTRACT

An image forming apparatus includes a control unit that generates a valid region signal corresponding to the length of a paper sheet of a regular size in the conveyance direction thereof, and performs control to form an image on the paper sheet based on the valid region signal, wherein, when an image is formed on a long paper sheet having a longer length than the paper sheet of the regular size, the control unit generates the valid region signal in each channel, performs control for generating the next valid region signal in a period during which the valid region signal is not generated in any of the channels, generates a continuous valid region signal corresponding to the long paper sheet by combining the valid region signals in the channels, and performs control to form an image by reading out image data based on the continuous valid region signal.

15 Claims, 4 Drawing Sheets

IMAGE FORMING APPARATUS, IMAGE FORMATION CONTROL PROGRAM, AND IMAGE FORMATION CONTROL METHOD

The entire disclosure of Japanese Patent Application No. 2014-128008 filed on Jun. 23, 2014 including description, claims, drawings, and abstract are incorporated herein by reference in its entirety.

BACKGROUND OF THE INVENTION

Field of the Invention

The present invention relates to an image forming apparatus, an image formation control program, and an image formation control method, and more particularly, to a technology for efficiently forming an image on a long paper sheet.

Description of the Related Art

An image forming apparatus normally forms images on paper sheets called cut paper sheets that are cut in a predetermined regular size such as "A4" or "B4". However, an image forming apparatus can also form an image on a long paper sheet called a paper roll. A long paper sheet is used when a label is repeatedly printed, for example.

Control operation to be performed in an image forming apparatus that uses long paper sheets is disclosed in JP 6-278938 A, for example.

JP 6-278938 A discloses a printer for long paper sheets. The length of an A3 paper sheet as a cut paper sheet is 42 cm. Meanwhile, some long paper sheets are approximately 2.4 km long.

That is, a long paper sheet may be 5700 times longer than an A3 paper sheet. Therefore, as for a counter that manages paper sheet lengths, it is necessary to prepare a special counter that is capable of processing a large number of bits so as to cope with such a long paper sheet length. It is also necessary to provide an additional memory as an image memory. In short, so as to cope with long paper sheets, a conventional image forming apparatus that normally uses cut paper sheets needs to be greatly modified in terms of hardware and software.

In view of costs, however, a conventional image forming apparatus is expected to cope with long paper sheets, without any significant modifications made in its hardware and software.

FIG. 4 is a timing chart showing the control that is performed in a case where an image is repeatedly formed on a long paper sheet through the same control as that for an image forming apparatus using conventional cut paper sheets.

In this case, image data is repeatedly read out while various control signals are exchanged between the engine control unit in the image forming unit and the memory controller in the image storage unit. Time t passes in the direction from the top to the bottom of the chart.

In FIG. 4, (a) represents the engine control unit that controls the print engine in the image forming unit, (b) represents a top position signal VTOP indicating the position of the top edge of an image, (c) represents a valid region signal (VALID signal) indicating that an image can be formed in the conveyance direction (the sub scanning direction) of the paper sheet, (d) represents the memory controller that performs control to read out image data from the image memory in the image storage unit, and (e) represents image data read out from the image memory in the image storage unit.

Although the valid region signal might be a horizontal valid region signal (H-VALID) or a vertical valid region signal (V-VALID), a vertical valid region signal is described in this example. That is, the valid region signal (VALID) means a vertical valid region signal (V-VALID) in this example. Here, the vertical direction is the sheet conveyance direction, and the horizontal direction is a direction perpendicular to the sheet conveyance direction.

Referring now to the timing chart in FIG. 4, the control to be performed when an image is formed on a long paper sheet through the control for a conventional image forming apparatus designed for cut paper sheets is described.

At a start of image formation using a long paper sheet, the engine control unit transmits setting data related to image formation on a long paper sheet, to the memory controller ((01) in FIG. 4).

In this case, how many paper sheets of a regular size (such as A3 paper, which is the largest) are equivalent in length to the long paper sheet is calculated, and setting data generated so that the control for the paper sheets of the regular size will be repeated a predetermined times is transmitted. With this, a special counter for long paper sheets becomes unnecessary, for example.

Meanwhile, when preparation for image data readout from the image memory is completed, the memory controller transmits a preparation completion notification to the engine control unit ((02) in FIG. 4).

The engine control unit then raises the pulse of the top position signal indicating the position of the top edge of the image, in time with feeding of the long paper sheet from the sheet feeding unit ((1) in (b) in FIG. 4). The hatched portions of the pulse ((1) in (b) in FIG. 4) of the top position signal indicate that the top position signal is active. The engine control unit transmits the pulse ((1) in (b) in FIG. 4) of the top position signal to the memory controller ((2) in (b) in FIG. 4).

After receiving the pulse of the top position signal ((2) in (b) in FIG. 4), the memory controller raises the valid region signal in the sub scanning direction ((3) in (c) in FIG. 4) in accordance with the top position signal in an active state. In this case, the hatched portions of the valid region signal ((c) in FIG. 4) indicate that the valid region signal is active.

While this valid region signal ((c) in FIG. 4) is in an active state, the memory controller repeatedly reads image data from the image memory ((e) in FIG. 4). In this case, while the valid region signal is active, the memory controller reads image data twice at an interval t1.

The memory controller performs counting in the sub scanning direction of the paper sheets of the regular size. As a result of the counting, at the time equivalent to the bottom edge of a paper sheet of the regular size, the memory controller puts the valid region signal into an inactive state, and transmits a valid region signal termination notification to the engine control unit ((4) in (c) in FIG. 4).

After receiving the valid region signal termination notification, the engine control unit transmits a setting notification including next page setting data to the memory controller ((5) in FIG. 4).

When preparation for readout from the image memory is completed, the memory controller, which has received the setting notification including the next page setting data, transmits a preparation completion notification to the engine control unit ((6) in FIG. 4).

After receiving the preparation completion notification, the engine control unit raises the pulse of the top position signal indicating the position of the top edge of an image ((1) in the second and later tiers in (b) in FIG. 4), and repeatedly performs the same operation as above ((1), (2), (3), (4), (5), and (6) in the second and later tiers in FIG. 4).

After generating the top position signal a predetermined number of times, the engine control unit performs control not to generate the top position signal ((1') and (2') in (b) in FIG. 4).

Accordingly, the memory controller does not raise the valid region signal in the sub scanning direction ((3') in (c) in FIG. 4), and stops reading out image data ((e) in FIG. 4).

In the above described control, the control operations of the respective components are involved in the transmission of a valid region signal termination signal from the memory controller to the engine control unit ((4) in FIG. 4), the transmission of a setting notification including next page setting data from the engine control unit to the memory controller ((5) in FIG. 4), and the transmission of a readout preparation operation and a preparation completion notification from the memory controller to the engine control unit ((6) in FIG. 4). Most of the control operations of the respective components are realized by software or the like. Therefore, a certain period of time is required, and the required period of time varies in some cases.

That is, time t2, which is the interval between image data readout operations and is the period of time during which the valid region signal is in an inactive state, cannot be fixed, and varies.

Further, time t1, which is the interval between image data readout operations and is the period of time during which the valid region signal is in an active state, can be fixed. However, since time t2 varies, time t1 and time t2 cannot be made uniform.

That is, when a label or the like is repeatedly printed on a long paper sheet with a conventional image forming apparatus designed for cut paper sheets without a special counter for long paper sheets, the intervals between printed portions such as labels cannot be made uniform, and productivity decreases by the amount equivalent to the interval unevenness, resulting in poorer efficiency.

SUMMARY OF THE INVENTION

An object of the present invention is to provide an image forming apparatus that can efficiently form an image when printing is performed on a long paper sheet with the image forming apparatus designed to form images on cut paper sheets, an image formation control program, and an image formation control method.

An image forming apparatus, an image formation control program, and an image formation control method as an aspect to solve the above described problem are designed as follows.

(1) To achieve the abovementioned object, according to an aspect, an image forming apparatus reflecting one aspect of the present invention comprises a control unit that generates a valid region signal corresponding to the length of a paper sheet of a regular size in the conveyance direction thereof, and performs control to form an image on the paper sheet by reading out image data based on the valid region signal, an image formation control program controls the image forming apparatus, and an image formation control method controls the image forming apparatus. When an image is formed on a long paper sheet having a longer length than the paper sheet of the regular size in the conveyance direction, the control unit generates the valid region signal in each of multiple channels; performs control for generating the next valid region signal in a period during which the valid region signal is not generated in any of the channels; generates a continuous valid region signal corresponding to the long paper sheet by combining the valid region signals in the channels; and performs control to form an image by reading out image data based on the continuous valid region signal.

(2) In Item. (1), the control unit preferably generates a basic valid region signal and an extended valid region signal as the valid region signal, the basic valid region signal being generated alternately in the channels and being not generated during a period, the extended valid region signal being generated alternately in the channels by partially extending the basic valid region signal so as to eliminate the period during which the extended valid region signal is not generated; performs control for generating the next basic valid region signal in the period during which the basic valid region signal is not generated in any of the channels; and generates the continuous valid region signal corresponding to the long paper sheet by combining the extended valid region signals in the channels.

(3) In Item. (2), the control unit preferably generates the extended valid region signal so as to include the period during which the basic valid region signal is not generated in any of the channels.

(4) In Items. (2) and (3), the control unit preferably performs the control for generating the next basic valid region signal in the period during which the basic valid region signal is not generated in any of the channels, the control involving a notification of termination of the basic valid region signal, a notification of setting of the next basic valid region signal, and a notification of completion of preparation for the image data readout in the period of the next basic valid region signal.

(5) In Items. (2) to (4), in the period during which the basic valid region signal is not generated in any of the channels, the control unit preferably performs the control for generating the next basic valid region signal through the same procedures as the procedures for controlling image formation on the paper sheet of the regular size.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, embodiments of an image forming apparatus, an image formation control program, and an image formation control method according to the present invention will be described in detail with reference to the drawings. However, the scope of the invention is not limited to the illustrated examples.

In the description below, the control procedures according to the image formation control program and the processing procedures according to the image formation control method will also be described in conjunction with explanation of operation of the image forming apparatus.

[Structure of an Image Forming Apparatus]

Figure 1:
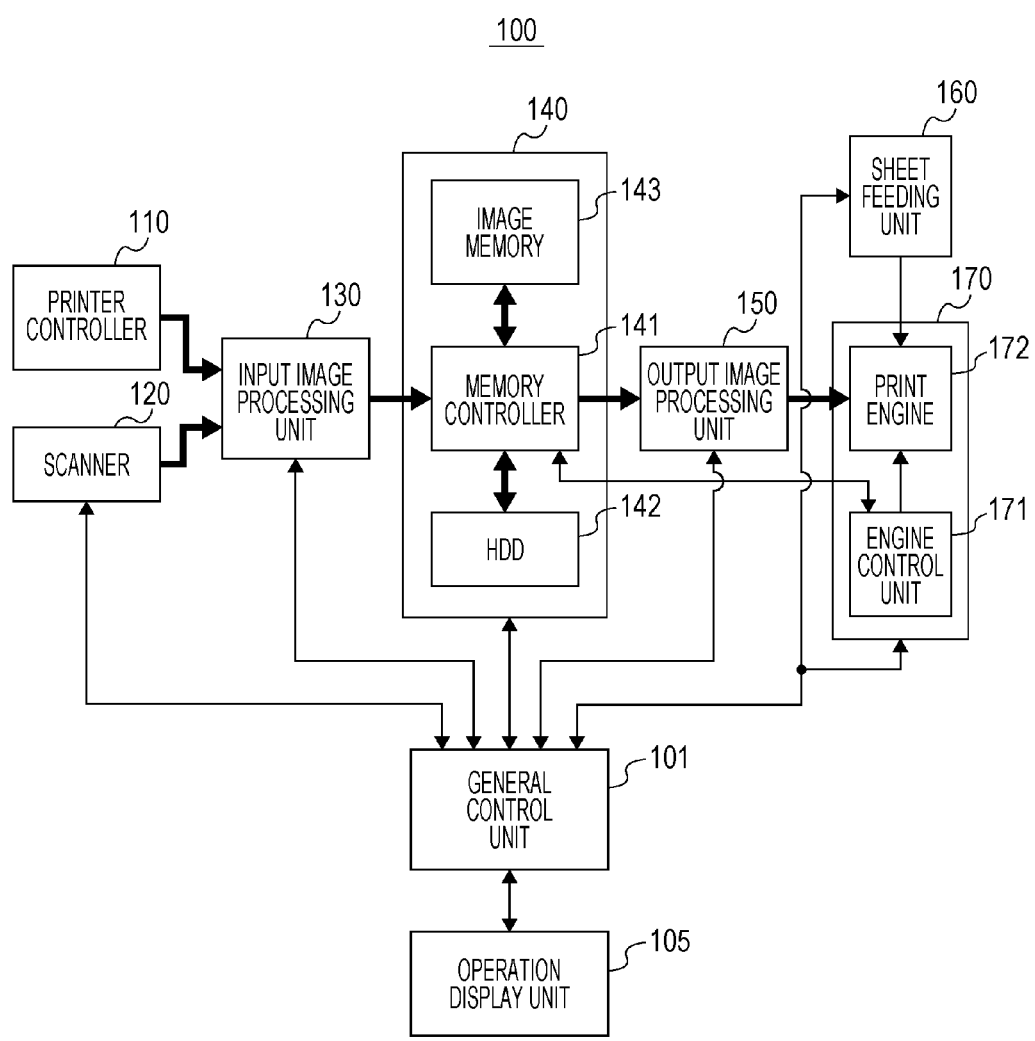
FIG. 1 is a diagram schematically showing a structure according to an embodiment of the present invention.

Referring now to FIG. 1, the structure of an electrophotographic image forming apparatus 100 of a first embodiment is described in detail.

It should be noted that, of the image forming apparatus 100, known and general components that are not directly relevant to characteristic operation and control of this embodiment will not be described below.

The image forming apparatus 100 shown in FIG. 1 includes a general control unit 101, an operation display unit 105, a printer controller 110, a scanner 120, an input image processing unit 130, an image storage unit 140, an output image processing unit 150, a sheet feeding unit 160, and an image forming unit 170.

The general control unit 101 controls the respective components in the image forming apparatus 100. The operation display unit 105 allows an operator to make various kinds of operational inputs thereto, and performs display in various manners. The printer controller 110 receives a supply of image data from outside. The scanner 120 scans a document and generates image data. The input image processing unit 130 performs input image processing on input image data. The image storage unit 140 stores image data and various kinds of data, and reads out image data in time with image formation. The output image processing unit 150 performs output image processing on image data read out by the image storage unit 140. The sheet feeding unit 160 supplies a recording paper sheet to the image forming unit 170 in time with image formation. The image forming unit 170 forms an image on a recording paper sheet based on image data.

The general control unit 101 includes a CPU (Central Processing Unit) (not shown), a ROM (Read Only Memory), a RAM (Random Access Memory), and the like. In this embodiment, the CPU executes various kinds of programs stored in the ROM, to collectively control the respective components of the image forming apparatus 100, using a predetermined area in the RAM as the work area.

The operation display unit 105 includes an input device such as a keyboard, a mouse, or a touch panel, and transmits various kinds of command signals that are input thereto, to the general control unit 101. The operation display unit 105 also includes a display unit such as an LCD (Liquid Crystal Display) or a CRT (Cathode Ray Tube), and displays various kinds of image data that are input from the general control unit 101. This operation display unit 105 may include an operation unit and a display unit that are provided independently of each other, but may be a touch panel on which displayed icons or keys (hereinafter referred to simply as "keys") are pressed.

The input image processing unit 130 performs input image processing, such as shading correction, a magnification process, a tilt correction process, and color conversion (from RGB to YMCK), on input image data obtained with the scanner 120. The input image processing unit 130 also performs input image processing, as necessary, on input image data obtained via the printer controller 110.

The image storage unit 140 includes: a memory controller 141 that performs various kinds of control related to storage; an HDD (Hard Disc Drive) 142 that accumulates and stores image data from the printer controller 110 and the scanner 120 in a nonvolatile manner; and an image memory 143 formed with a DRAM (Dynamic Random Access Memory) or the like that temporarily stores image data that is in a decompressed state and is to be output for image formation.

The output image processing unit 150 performs output image processing necessary for image formation, such as printer gamma conversion, an error diffusion process, or a fine magnification process, on the image data stored in the image storage unit 140.

The sheet feeding unit 160 stores paper sheets of regular sizes in sheet feeding trays, stores long paper sheets such as paper rolls in a long paper storage unit, and supplies a recording paper sheet on which an image is to be formed, to the image forming unit 170 in time with image formation.

The image forming unit 170 is an image forming unit or a printing device of an electrophotographic type or some other type, and forms an image on a predetermined recording paper sheet in a copier, a printer, or a facsimile device, and outputs the paper sheet.

The image forming unit 170 includes: an engine control unit 171 that performs various kinds of control related to image formation; and a print engine 172 that performs image formation based on image data sent form the output image processing unit 150.

[Operation of the Image Forming Apparatus]

Operation of the image forming apparatus is now described. The operation of the image forming apparatus is performed through the control procedures according to the image formation control program and the processing procedures according to the image formation control method. The general control unit 101, the memory controller 141, and the engine control unit 171 function as the control unit that controls this embodiment. The operation is described below, with reference to the flowchart in FIG. 2 and the timing chart in FIG. 3.

Figure 3:
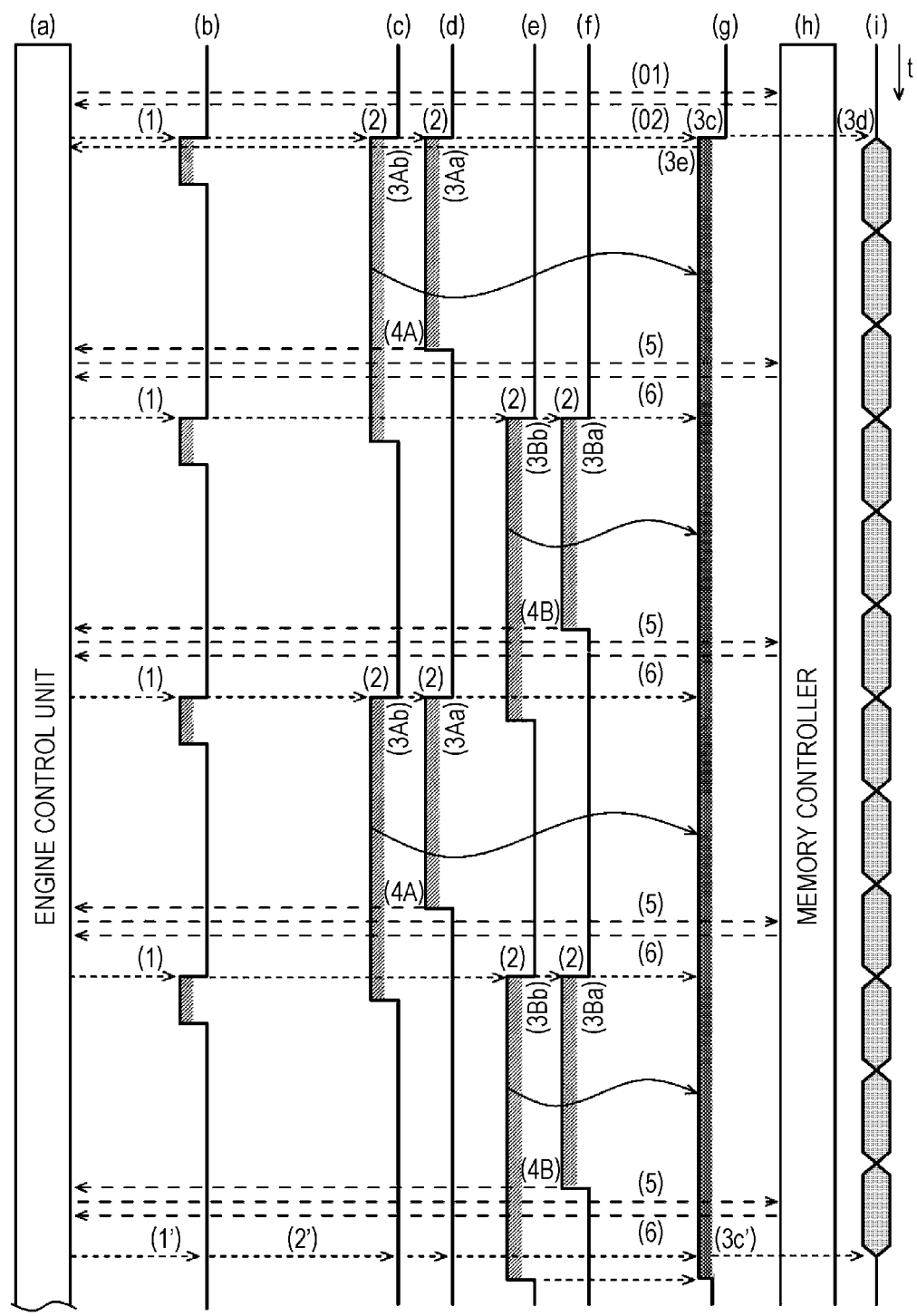
FIG. 3 is a timing chart showing control according to the embodiment of the present invention.
Figure 4:
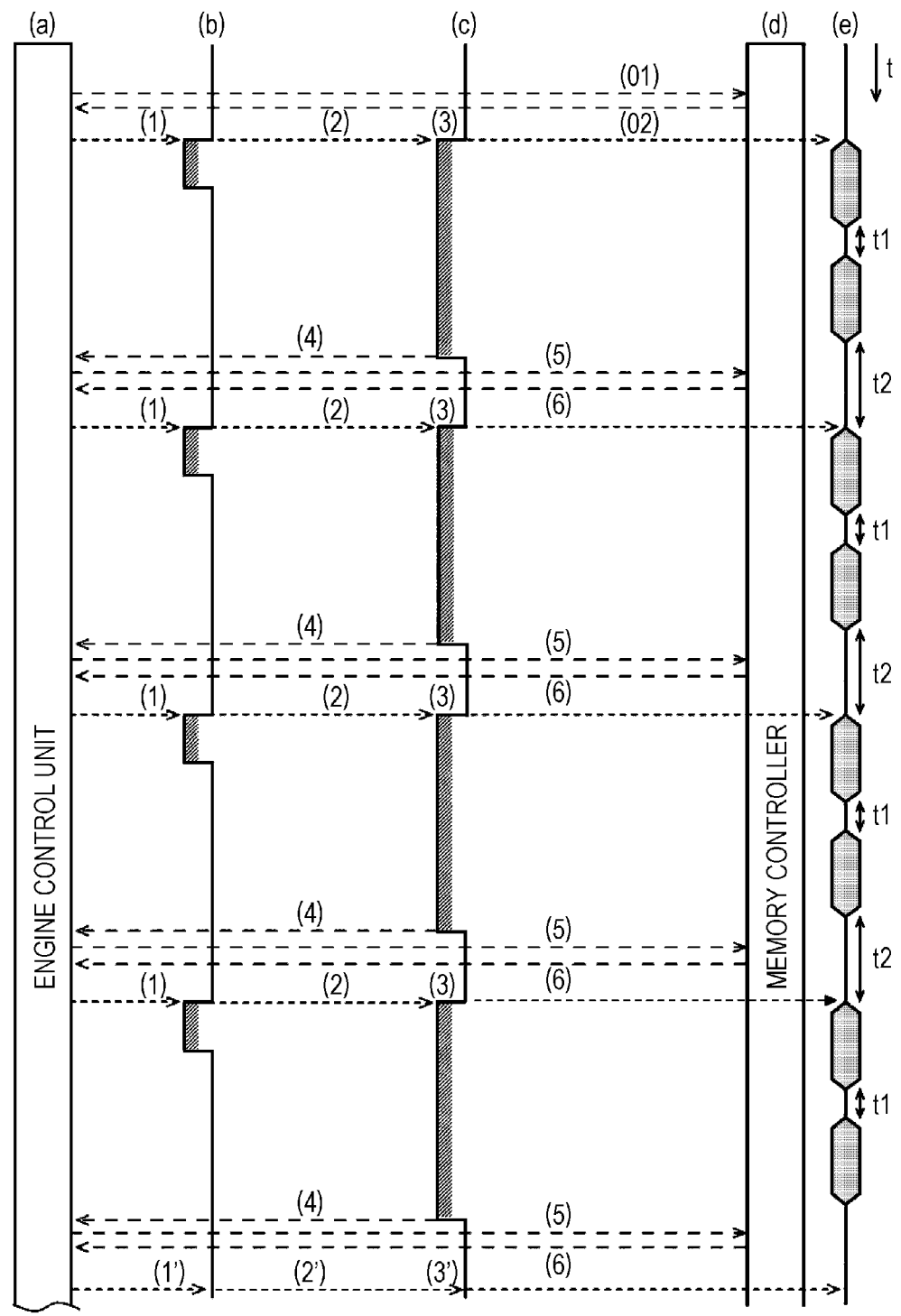
FIG. 4 is a timing chart showing control according to a conventional embodiment.

In FIG. 3, (a) represents the engine control unit 171 that controls the print engine in the image forming unit, (b) represents a top position signal VTOP indicating the position of the top edge of an image, (c) represents an extended valid region signal generated in channel A by extending a basic valid region signal in the conveyance direction (the sub scanning direction) of paper sheets, (d) represents the basic valid region signal in channel A, indicating that an image can be formed on a cut paper sheet in the conveyance direction (the sub scanning direction) of paper sheets, (e) represents an extended valid region signal generated in channel B by extending a basic valid region signal in the conveyance direction (the sub scanning direction) of paper sheets, (f) represents the basic valid region signal in channel B, indicating that an image can be formed on a cut paper sheet in the conveyance direction (the sub scanning direction) of paper sheets, (g) represents a continuous valid region signal indicating that an image can be formed in the conveyance direction (the sub scanning direction) of long paper sheets, (h) represents the memory controller 141 that performs control so that image data is read out from the image memory 143 in the image storage unit 140, and (i) represents image data read out from the image memory 143 in the image storage unit 140.

Although the valid region signals (VALID) might be horizontal valid region signals (H-VALID) or vertical valid region signals (V-VALID), vertical valid region signals are described in this embodiment. That is, a valid region signal (VALID) means a vertical valid region signal (V-VALID) in this embodiment. Here, the vertical direction is the sheet conveyance direction, and the horizontal direction is a direction perpendicular to the sheet conveyance direction.

Referring now to the timing chart in FIG. 3, the control to be performed when an image is formed on a long paper sheet through conventional control for cut paper sheets in the image forming apparatus 100 is described.

[Initial Setting Process]

Figure 2:
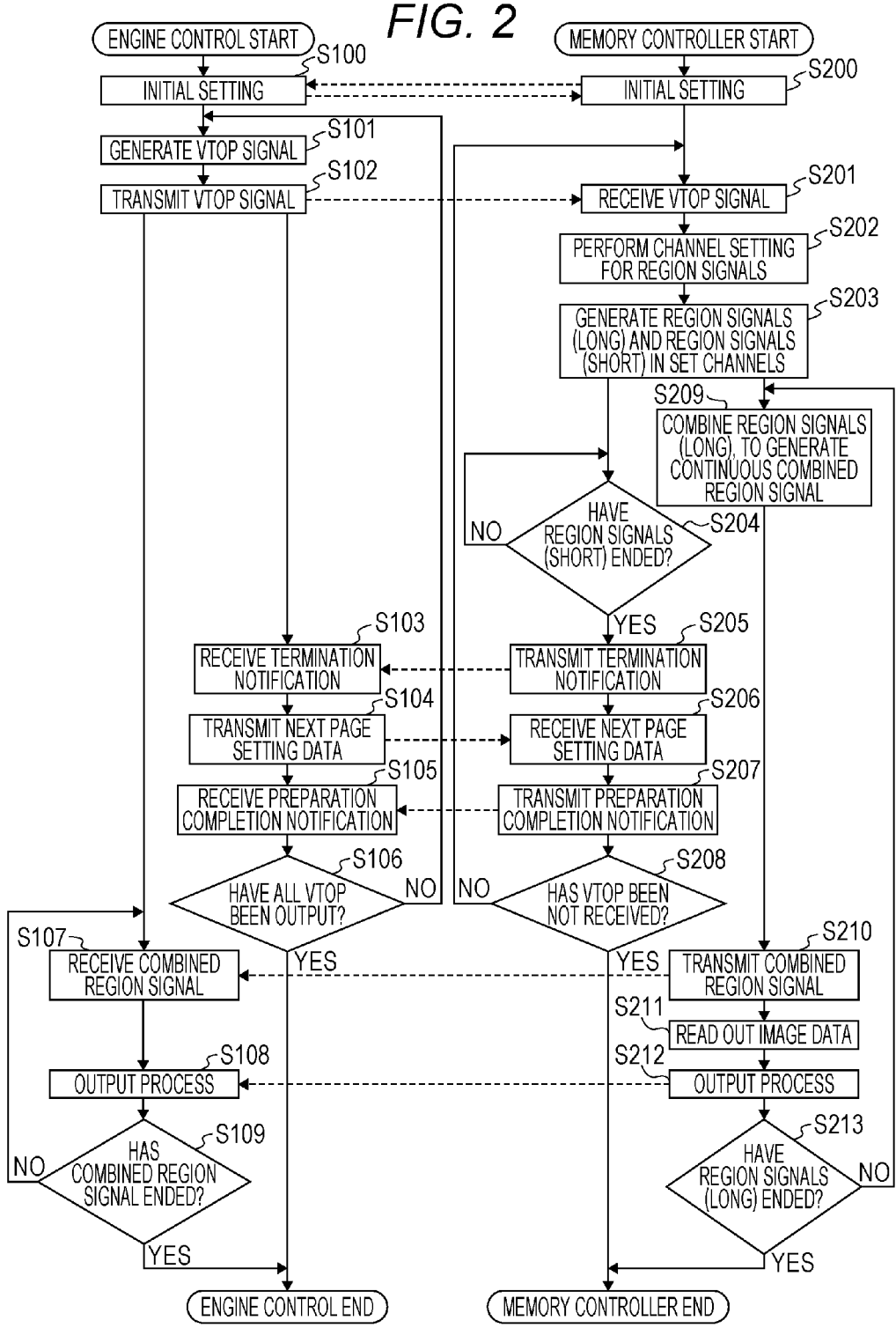
FIG. 2 is a flowchart showing an operation according to the embodiment of the present invention.

At a start of image formation using a long paper sheet, the engine control unit 171 transmits setting data related to image formation on a long paper sheet, to the memory controller 141 (step S100 in FIG. 2, (01) between (a) and (h) in FIG. 3).

In this case, how many paper sheets of a regular size (such as A3 paper or A4 paper) are equivalent in length to the long paper sheet is calculated, and setting data generated so that control for the paper sheets of the regular size will be repeated a predetermined times is transmitted. With this, a special counter for long paper sheets and an additional memory become unnecessary, for example.

Meanwhile, when preparation for image data readout from the image memory 143 is completed, the memory controller 141 transmits a preparation completion notification to the engine control unit 171 (step S200 in FIG. 2, (02) between (h) and (a) in FIG. 3).

[Process (1) of Generating a Basic Valid Region Signal and an Extended Valid Region Signal]

The memory controller 141 reads, from the HDD 142, the image data to be used to form an image, and copies the image data into the image memory 143. When the copying of the image data into the image memory 143 is completed, the memory controller 141 transmits a preparation completion notification to the engine control unit 171.

The engine control unit 171 then raises the pulse of the top position signal VTOP indicating the position of the top edge of an image, in time with feeding of a long paper sheet from the sheet feeding unit 160 (S101 in FIG. 2, (1) in (b) in FIG. 3). In this embodiment, the engine control unit 171 calculates how many paper sheets of a regular size are equivalent in length to the long paper sheet to be used, and generates the top position signal VTOP in accordance with the equivalent number of the paper sheets of the regular size.

The hatched portions of the pulse ((1) in (b) in FIG. 3) of the top position signal VTOP indicate that the top position signal VTOP is active. The engine control unit 171 transmits the pulse ((1) in (b) in FIG. 3) of the top position signal VTOP to the memory controller 141 (S102 in FIG. 2, (2) in (c) and (d) in FIG. 3).

After receiving the pulse of the top position signal VTOP (step S201 in FIG. 2), the memory controller 141 performs channel setting so as to generate valid region signals in one of multiple channels (step S202 in FIG. 2).

The multiple channels are two or more channels. In this embodiment, a specific example where valid region signals are generated in two channels is described. In FIG. 3, (c) and (d) belong to channel A, and (e) and (f) belong to channel B.

In this embodiment, channels are switched in an alternate manner such as from channel A to channel B to channel A. In a case where there are three or more channels, the channels can be sequentially switched.

Specifically, based on the top position signal VTOP in an active state, the memory controller 141 performs control to generate a basic valid region signal and an extended valid region signal in channel A, which is a set channel (step S203 in FIG. 2).

Here, basic valid region signals are generated as valid region signals alternately in the multiple channels, but are not generated during some periods, as indicated by (d) and (f) in FIG. 3. These periods are equivalent to the sheet feeding periods in a case where conventional cut paper sheets are used.

As indicated by (c) and (e) in FIG. 3, extended valid region signals are generated as valid region signals alternately in the multiple channels, as if the basic valid region signals were partially extended so as to overlap with one another and eliminate the periods during which any signals are not generated.

In the flowchart in FIG. 2, the basic valid region signals are referred to as "region signals (short)", and the extended valid region signals are referred to as "region signals (long)".

Alternatively, the basic valid region signals may be considered as obtained by allotting conventional valid region signals to the multiple channels. In this embodiment, the basic valid region signals do not need to completely correspond to conventional valid region signals. That is, the basic valid region signals are not generated during some periods, while being alternately generated in the multiple channels. Accordingly, the basic valid region signals may be shorter in the sub scanning direction than conventional valid region signals.

That is, in channel A, which is a set channel, the memory controller 141 generates a basic valid region signal ((3Aa) in (d) in FIG. 3) and an extended valid region signal ((3Ab) in (c) in FIG. 3) based on the top position signal VTOP in an active state (step S203 in FIG. 2, (2) in (c) and (d) in FIG. 3). In this case, the hatched portions of the basic valid region signal ((d) in FIG. 3) and the extended valid region signal ((c) in FIG. 3) indicate that these signals are active as valid region signals.

[Process of Ending a Basic Valid Region Signal]

The memory controller 141 performs counting in the sub scanning direction of the paper sheets of the regular size. Based on a result of the counting, the memory controller 141 puts the basic valid region signal into an inactive state through control similar to the control performed by a conventional image forming apparatus for cut paper sheets at the time equivalent or close to the bottom end of a paper sheet of the regular size (Yes in step S204 in FIG. 2, (4A) in (d) in FIG. 3).

During this period, no basic valid region signals are generated in the channels, and the memory controller 141 and the engine control unit 171 perform control for generating the next basic valid region signal in the same manner as the conventional control for cut paper sheets.

So as to be similar to the control by a conventional image forming apparatus for cut paper sheets, the control for generating the next basic valid region signal in the period during which no basic valid region signals are generated in the channels involves a notification of termination of the basic valid region signal, a notification of setting of the next basic valid region signal, and a notification of completion of preparation for the image data readout in the period of the next basic valid region signal.

Specifically, the memory controller 141 transmits a notification of termination of the basic valid region signal to the engine control unit 171 (step S205 in FIG. 2).

After receiving the notification of termination of the basic valid region signal (step S103 in FIG. 2), the engine control unit 171 transmits a setting notification ((5) in FIG. 3) including the next page setting data for the basic valid region signal to the memory controller 141 (step S104 in FIG. 2). As a continuous valid region signal for the long paper sheet is also generated in this embodiment, the next page setting data for the basic valid region signal may be dummy data for performing the conventional control for cut paper sheets in simulative manner.

After receiving the next page setting data (step S206 in FIG. 2), the memory controller 141 transmits a preparation completion notification to the engine control unit 171 (step S207 in FIG. 2, (6) in FIG. 3). As the continuous valid region signal for the long paper sheet is also generated, and the image data is read out in this embodiment, this preparation completion notification may be dummy data for performing the conventional control for cut paper sheets in a simulative manner.

[Process (2) of Generating a Basic Valid Region Signal and an Extended Valid Region Signal]

After receiving the preparation completion notification (step S105 in FIG. 2), the engine control unit 171 checks the number of times the top position signal VTOP has been generated (step S106 in FIG. 2). As described above, in this embodiment, the engine control unit 171 calculates how many paper sheets of a regular size are equivalent in length to the long paper sheet to be used, and generates the top position signal VTOP in accordance with the equivalent number of the paper sheets of the regular size.

Therefore, if the upper limit number for the top position signal VTOP is not exceeded (NO in step S106 in FIG. 2), the engine control unit 171 raises the pulse of the top position signal VTOP indicating the position of the top edge of an image (step S101 in FIG. 2, the second (1) from the top in (b) FIG. 3). The engine control unit 171 transmits the pulse (the second (1) from the top in (b) in FIG. 3) of the top position signal VTOP to the memory controller 141 (step S102 in FIG. 2, (2) in (e) and (f) in FIG. 3).

As the continuous valid region signal for the long paper sheet is also generated in this embodiment, and the second and later generation and transmission of the top position signal VTOP are performed to execute the conventional control for cut paper sheets in a simulative manner and generate a basic valid region signal and an extended valid region signal in another channel as described later.

After receiving the pulse of the top position signal VTOP (step S201 in FIG. 2), the memory controller 141 performs channel setting so as to generate valid region signals in one of the multiple channels (step S202 in FIG. 2).

In this case, a basic valid region signal and an extended valid region signal have already been generated in channel A through the previous process, and therefore, valid region signals are to be generated in channel B.

That is, in channel B, which is a set channel, the memory controller 141 generates a basic valid region signal ((3Ba) in (f) in FIG. 3) and an extended valid region signal ((3Bb) in (e) in FIG. 3) (step S203 in FIG. 2, (2) in (e) and (f) in FIG. 3) based on the top position signal VTOP in an active state (the second (1) from the top in (b) in FIG. 3). In this case, the hatched portions of the basic valid region signal ((f) in FIG. 3) and the extended valid region signal ((e) in FIG. 3) indicate that these signals are active as valid region signals.

Thereafter, the process of ending a basic valid region signal and the process (2) of generating a basic valid region signal and an extended valid region signal are repeated alternately in channel A and channel B.

[Process of Generating a Continuous Valid Region Signal]

Based on the extended valid region signal in channel A ((3Ab) in (c) in FIG. 3) or the extended valid region signal in channel B ((3Bb) in (e) in FIG. 3, whichever is in an active state, the memory controller 141 generates a continuous valid region signal ((3c) in (g) in FIG. 3) that is in a continuous state in accordance with the length of the long paper sheet in the sub scanning direction (step S209 in FIG. 2). In this case, the cross-hatched portion of the continuous valid region signal ((g) in FIG. 3) indicates that this signal is active as a valid region signal.

The extended valid region signal is generated, with the active periods overlapping each other between channel A and channel B, as shown in (c) and (e) in FIG. 3. Accordingly, the continuous valid region signal is maintained in a continuous state until both extended valid region signals are completely stopped.

[Process of Reading Out and Outputting Image Data Using the Continuous Valid Region Signal]

By combining the extended valid region signals in the multiple channels, the memory controller 141 continuously generates the continuous valid region signal that is uninterrupted in accordance with the valid region of the long paper sheet (step S209 in FIG. 2). The memory controller 141 transmits this continuous valid region signal as a valid region signal to the engine control unit 171 (steps S210 and S107 in FIG. 2).

While this continuous valid region signal ((g) in FIG. 3) is in an active state ((3c) and later in (g) in FIG. 3), the memory controller 141 starts repeatedly reading image data from the image memory 143 (step S211 in FIG. 2, (3d) in (i) in FIG. 3).

Since the continuous valid region signal ((g) in FIG. 3) is continuously in an active state in accordance with the long paper sheet in this embodiment, the memory controller 141 can continuously read image data from the image memory 143 without intermission, or can maintain uniform intervals between the respective pieces of image data when reading the image data from the image memory 143.

While the image data is read out ((i) in FIG. 3) based on the continuous valid region signal ((g) in FIG. 3), the conventional control for cut paper sheets is performed in a simulative manner ((5) and (6) in FIG. 3) in the periods during which any basic valid region signal ((d) or (f) in FIG. 3) is not generated. Accordingly, there is no need to prepare a special counter for long paper sheets and an additional memory, for example.

The image data read out from the image memory 143 under the control of the memory controller 141 is processed for output by the output image processing unit 150 (step S212 in FIG. 2), and is further supplied to the print engine 172 in the image forming unit 170. Based on the image data ((i) in FIG. 3) repeatedly read out from the image memory 143, the print engine 172 in the image forming unit 170 performs image formation on the long paper sheet supplied from the sheet feeding unit 160 (step S108 in FIG. 2). For example, image formation is repeatedly performed on the long paper sheet in accordance with the read image data.

[End Process]

The continuous generation of the continuous valid region signal (step S209 in FIG. 2), the image data readout (step S211 in FIG. 2), and the output process (step S212 in FIG. 2) are repeatedly performed (step S213 in FIG. 2, (i) in FIG. 3) until the generation of the top position signal VTOP by the engine control unit 171 ends (steps S106 and S208 in FIG. 2, (1') and (2') in FIG. 3), or the extended valid region signals stop being generated in both of the channels and the continuous valid region signal becomes inactive (steps S109 and S213 in FIG. 2, (3c') in FIG. 3).

That is, when the generation of the top position signal VTOP by the engine control unit 171 ends (YES in step S106 and YES in step S208 in FIG. 2, (1') and (2') in FIG. 3), or when the extended valid region signals stop being generated in both of the channels and the continuous valid region signal becomes inactive (YES in step S109 and YES in step S213 in FIG. 2), (3c') in FIG. 3), the image formation using the long paper sheet comes to an end (the engine control end and the memory controller end in FIG. 2).

Effects to be Achieved by the Embodiment (1) In this embodiment, when an image is formed on a long paper sheet with the image forming apparatus 100 designed to generate a valid region signal corresponding to the length of a paper sheet of a regular size in the conveyance direction thereof and perform control to form an image on the paper sheet by reading out image data based on the valid region signal, the valid region signal is generated in each of multiple channels, control for generating the next valid region signal is performed in a simulative manner in a period during which the valid region signal is not generated in any of the multiple channels, a continuous valid region signal corresponding to the long paper sheet is generated by combining the valid region signals in the multiple channels, and control is performed to form an image by reading out image data based on the continuous valid region signal.

That is, when printing is performed on a long paper sheet with the image forming apparatus for forming images on cut paper sheets, image data is read based on the continuous valid region signal, and an image is formed, while control for paper sheets of a regular size is performed in a simulative manner. In this manner, image formation can be efficiently performed, without a special-purpose counter for long paper sheets or an additional memory, for example, and without special control for long paper sheets.

Since the continuous valid region signal is continuously in an active state in accordance with the long paper sheet in this embodiment, the memory controller 141 can continuously read image data from the image memory 143 without intermission, or can maintain uniform intervals between the respective pieces of image data or can set an interval for each one line when reading the image data from the image memory 143.

(2) In (1), a basic valid region signal and an extended valid region signal are generated as the valid region signal, the basic valid region signal being generated alternately in the channels and being not generated during a period, the extended valid region signal being generated alternately in the channels by partially extending the basic valid region signal so as to eliminate the period during which the extended valid region signal is not generated. Control for generating the next basic valid region signal is performed in the period during which the basic valid region signal is not generated in any of the channels, and the continuous valid region signal corresponding to the long paper sheet is generated by combining the extended valid region signals in the channels.

That is, when printing is performed on a long paper sheet with the image forming apparatus designed to form images on cut paper sheets, image data is readout and an image is formed based on the continuous valid region signal, while control for paper sheets of a regular size is performed with the basic valid region signal in a simulative manner. Accordingly, an image can be efficiently formed, without any special control performed for the long paper sheet.

(3) In (2), the extended valid region signal is generated so as to include the period during which the basic valid region signal is not generated in any of the channels, so that image data can be read out and an image can be formed based on the continuous valid region signal. Accordingly, an image can be efficiently formed, without any special control performed for the long paper sheet.

(4) In (2) and (3), in the period during which the basic valid region signal is not generated in any of the channels, the control for generating the next basic valid region signal involves a notification of termination of the basic valid region signal, a notification of setting of the next basic valid region signal, and a notification of completion of preparation for the image data readout in the period of the next basic valid region signal. Accordingly, when printing is performed on a long paper sheet with the image forming apparatus designed to form images on cut paper sheets, image data can be read out and an image can be formed based on the continuous valid region signal, while control for a paper sheet of a regular size is performed with the basic valid region signal in a simulative manner. That is, an image can be efficiently formed, without any special control performed for the long paper sheet.

(5) In (2) to (4), in the period during which the basic valid region signal is not generated in any of the channels, the control for generating the next basic valid region signal is performed through the same procedures as the procedures for controlling image formation on the paper sheet of the regular size. Accordingly, when printing is performed on a long paper sheet with the image forming apparatus designed to form images on cut paper sheets, image data can be read out and an image can be formed based on the continuous valid region signal, while handshake control is performed in a simulative manner through the same procedures as the conventional procedures. That is, an image can be efficiently formed, without any special control performed for the long paper sheet.

Modifications of the Embodiment

In the above described embodiment, various kinds of control are performed between the memory controller 141 and the engine control unit 171. However, the components and their names mentioned above are examples, and the present invention is not limited to them.

That is, this embodiment can be applied to various other components for generating valid region signals, reading image data from an image memory, and forming an image based on the read image data.

For example, this embodiment can also be applied in a case where the memory controller 141 and the engine control unit 171 are realized by one processor, or where the memory controller 141 and the engine control unit 171 are realized by controllers with different names.

Further, the image formation control program for controlling the respective components through the above described operation procedures is also included in this embodiment.

Since this embodiment does not require any special counter for long paper sheets or any additional memory, a conventional image forming apparatus into which the image formation control program of this embodiment is installed can perform the above described operation.

Although the present invention has been described and illustrated in detail, it is clearly understood that the same is by way of illustrated and example only and is not to be taken by way of limitation, the scope of the present invention being interpreted by terms of the appended claims.

What is claimed is:
1. An image forming apparatus comprising:
an image memory which stores image data, and
a processor which is configured to generate a valid region signal corresponding to a length of a paper sheet of a regular size in a conveyance direction thereof, and perform control to form an image on the paper sheet by reading out image data from the image memory while the valid region signal is in an active state, wherein, when an image is formed on a long paper sheet having a longer length than the paper sheet of the regular size in the conveyance direction, the processor:

generates the valid region signal in each channel of a plurality of channels, performs control for generating the next valid region signal in a period during which the valid region signal is not generated in any of the channels, generates a continuous valid region signal by combining the valid region signals in the channels, the continuous valid region signal being continuous in accordance with the long paper sheet, and performs control to form an image by reading out image data from the image memory based on the continuous valid region signal, and wherein the processor repeatedly reads out image data from the image memory while the continuous valid region signal is in an active state.

2. The image forming apparatus according to claim 1, wherein the processor:

generates a basic valid region signal and an extended valid region signal as the valid region signal, the basic valid region signal being generated alternately in the channels and being not generated during a period, the extended valid region signal being generated alternately in the channels by partially extending the basic valid region signal so as to eliminate a period during which the extended valid region signal is not generated, performs control for generating the next basic valid region signal in the period during which the basic valid region signal is not generated in any of the channels, and generates the continuous valid region signal by combining the extended valid region signals in the channels, the continuous valid region signal being continuous in accordance with the long paper sheet.

3. The image forming apparatus according to claim 2, wherein the processor generates the extended valid region signal so as to include the period during which the basic valid region signal is not generated in any of the channels.

4. The image forming apparatus according to claim 2, wherein the processor performs the control for generating the next basic valid region signal in the period during which the basic valid region signal is not generated in any of the channels, the control including a notification of termination of the basic valid region signal, a notification of setting of the next basic valid region signal, and a notification of completion of preparation for the image data readout in a period of the next basic valid region signal.

5. The image forming apparatus according to claim 2, wherein, in the period during which the basic valid region signal is not generated in any of the channels, the processor performs the control for generating the next basic valid region signal through the same procedures as procedures for controlling image formation on the paper sheet of the regular size.

6. A non-transitory recording medium storing a computer readable program that is executable by a computer of an image forming apparatus including an image memory which stores image data, the program being executable by the computer to cause the computer to perform functions comprising:

generating a valid region signal corresponding to a length of a paper sheet of a regular size in a conveyance direction thereof, performing control to form an image on the paper sheet by reading out image data from the image memory while the valid region signal is in an active state, and when an image is formed on a long paper sheet having a longer length than the paper sheet of the regular size in the conveyance direction:

generating the valid region signal in each channel of a plurality of channels, performing control for generating the next valid region signal in a period during which the valid region signal is not generated in any of the channels, generating a continuous valid region signal by combining the valid region signals in the channels, the continuous valid region signal being continuous in accordance with the long paper sheet, and performing control to form an image by reading out image data from the image memory based on the continuous valid region signal, wherein the program causes the computer to repeatedly read out image data from the image memory while the continuous valid region signal is in an active state.

7. The non-transitory recording medium storing a computer readable program according to claim 6, wherein the program causes the computer to:

generate a basic valid region signal and an extended valid region signal as the valid region signal, the basic valid region signal being generated alternately in the channels and being not generated during a period, the extended valid region signal being generated alternately in the channels by partially extending the basic valid region signal so as to eliminate a period during which the extended valid region signal is not generated, perform control for generating the next basic valid region signal in the period during which the basic valid region signal is not generated in any of the channels, and generate the continuous valid region signal by combining the extended valid region signals in the channels, the continuous valid region signal being continuous in accordance with the long paper sheet.

8. The non-transitory recording medium storing a computer readable program according to claim 7, wherein the program causes the computer to generate the extended valid region signal so as to include the period during which the basic valid region signal is not generated in any of the channels.

9. The non-transitory recording medium storing a computer readable program according to claim 7, wherein the program causes the computer to perform the control for generating the next basic valid region signal in the period during which the basic valid region signal is not generated in any of the channels, the control including a notification of termination of the basic valid region signal, a notification of setting of the next basic valid region signal, and a notification of completion of preparation for the image data readout in a period of the next basic valid region signal.

10. The non-transitory recording medium storing a computer readable program according to claim 7, wherein, in the period during which the basic valid region signal is not generated in any of the channels, the program causes the computer to perform the control for generating the next basic valid region signal through the same procedures as procedures for controlling image formation on the paper sheet of the regular size.

11. An image formation control method for controlling an image forming apparatus including an image memory which stores image data, the method comprising:

generating a valid region signal corresponding to a length of a paper sheet of a regular size in a conveyance direction thereof, and performing control to form an image on the paper sheet by reading out image data from the image memory while the valid region signal is in an active state, and when an image is formed on a long paper sheet having a longer length than the paper sheet of the regular size in the conveyance direction:

generating the valid region signal in each channel of a plurality of channels, performing control for generating the next valid region signal in a period during which the valid region signal is not generated in any of the channels, generating a continuous valid region signal by combining the valid region signals in the channels, the continuous valid region signal being continuous in accordance with the long paper sheet, and performing control to form an image by reading out image data from the image memory based on the continuous valid region signal, wherein image data is repeatedly read out from the image memory while the continuous valid region signal is in an active state.

12. The image formation control method according to claim 11, further comprising:

generating a basic valid region signal and an extended valid region signal as the valid region signal, the basic valid region signal being generated alternately in the channels and being not generated during a period, the extended valid region signal being generated alternately in the channels by partially extending the basic valid region signal so as to eliminate a period during which the extended valid region signal is not generated, performing control for generating the next basic valid region signal in the period during which the basic valid region signal is not generated in any of the channels, and generating the continuous valid region signal by combining the extended valid region signals in the channels, the continuous valid region signal being continuous in accordance with the long paper sheet.

13. The image formation control method according to claim 12, wherein the extended valid region signal is generated so as to include the period during which the basic valid region signal is not generated in any of the channels.

14. The image formation control method according to claim 12, wherein the method comprises performing the control for generating the next basic valid region signal in the period during which the basic valid region signal is not generated in any of the channels, the control including a notification of termination of the basic valid region signal, a notification of setting of the next basic valid region signal, and a notification of completion of preparation for the image data readout in a period of the next basic valid region signal.

15. The image formation control method according to claim 12, wherein, in the period during which the basic valid region signal is not generated in any of the channels, the method comprises performing the control for generating the next basic valid region signal through the same procedures as procedures for controlling image formation on the paper sheet of the regular size.

* * * * *